No. 624,410. Patented May 2, 1899.
M. Z. VILLEFEU.
TAG HOLDER.
(Application filed Oct. 24, 1898.)
(No Model.)

WITNESSES:
Edward Thorpe
C. R. Ferguson

INVENTOR
M. Z. Villefeu
BY
ATTORNEYS.

THE NORRIS PETERS CO., PHOTO-LITHO., WASHINGTON, D. C.

UNITED STATES PATENT OFFICE.

MARIE ZILPHA VILLEFEU, OF BABYLON, NEW YORK.

TAG-HOLDER.

SPECIFICATION forming part of Letters Patent No. 624,410, dated May 2, 1899.

Application filed October 24, 1898. Serial No. 694,415. (No model.)

*To all whom it may concern:*

Be it known that I, MARIE ZILPHA VILLEFEU, of Babylon, in the county of Suffolk and State of New York, have invented a new and Improved Tag-Holder, of which the following is a full, clear, and exact description.

This invention relates to improvements in devices for holding shipping or address tags on bicycles, packages, or the like; and the object is to provide a tag-holder that shall be simple and comparatively inexpensive and that may be quickly and easily applied to the frame or handle-bar of a bicycle or to the fastening-cord of a package.

I will describe a tag-holder embodying my invention and then point out the novel features in the appended claims.

Reference is to be had to the accompanying drawings, forming a part of this specification, in which similar characters of reference indicate corresponding parts in both views.

Figure 1:
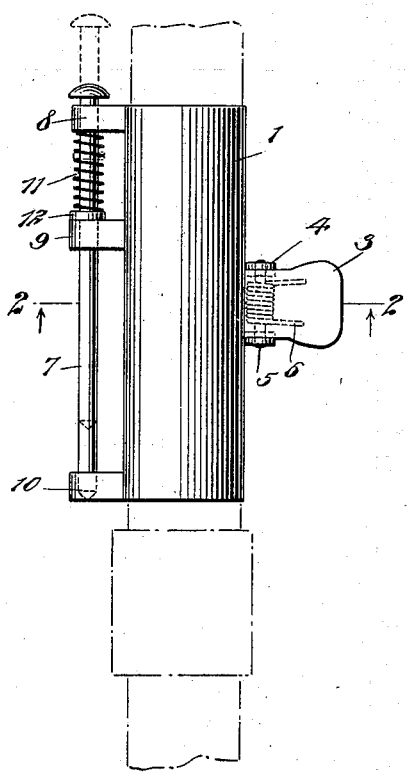
Figure 2:
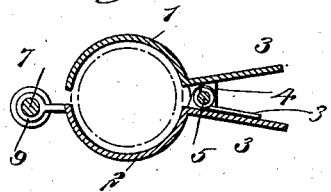

Figure 1 is a plan view of a tag-holder embodying my invention, and Fig. 2 is a section on the line 2 2 of Fig. 1.

The tag-holder comprises two jaws 1 2, each here shown as semicircular in cross-section, but they may be otherwise shaped to conform to the article with which they are to be engaged. Extended outward from the central portion of each jaw is a finger-piece 3, and these finger-pieces have inwardly-projected lugs 4, through which a pivot-pin 5 is extended. The jaws are held yieldingly together by means of a spring 6, coiled around the pivot-pin and having its ends engaged with the finger-pieces.

Mounted to slide relatively to the jaws and longitudinally thereof is a tag-holding pin 7. This pin is movable through lugs 8 9, extended from one of the jaws, and a lug 10 on the jaw serves as a socket to receive the end of the pin, the pin being held yieldingly in place by a coiled spring 11, engaging at one end with the lug 8 and at the other end with a collar 12, affixed to the pin.

In use on a bicycle the jaws are to be engaged around the handle-bar or some other portion of the frame. Then the pin 7 is to be moved out of the socket 10, after which it is to be forced through a tag or card, the end of the pin being pointed to facilitate its passage through the tag.

It is obvious that my invention may be used for other purposes than that of tag-holding—that is, it may be employed for holding small packages or the like.

Having thus described my invention, I claim as new and desire to secure by Letters Patent—

1. A tag-holder, comprising spring-pressed jaws, and a pin carried by and movable longitudinally of the jaws, substantially as specified.

2. A tag-holder, comprising spring-pressed jaws, lugs extended from one of said jaws, a spring-pressed pin movable in said lugs, and a socket-lug for receiving the end of the pin, substantially as specified.

3. A tag-holder comprising spring-pressed pivoted jaws, one of said jaws having lugs extending at intervals from its free edge and a spring-pressed pin fitted to slide in said lugs, substantially as specified.

4. A tag-holder comprising spring-pressed pivoted jaws, one of said jaws having a plurality of lugs extending at intervals along its free edge, a pin fitted to slide in the said lugs and a spring coiled around said pin between two of said lugs, said spring having one end bearing against said pin and the other against a lug whereby to hold said pin in place substantially as specified.

MARIE ZILPHA VILLEFEU.

Witnesses:
HELÉNE VILLEFEU,
CARRIE WICKS.